United States Patent
Choi

(10) Patent No.: US 11,654,925 B2
(45) Date of Patent: May 23, 2023

(54) DEVICE AND METHOD FOR RECOGNIZING WIDTH OF VEHICLE

(71) Applicant: HYUNDAI MOBIS CO., LTD., Seoul (KR)

(72) Inventor: Kwang Il Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 219 days.

(21) Appl. No.: 17/105,265

(22) Filed: Nov. 25, 2020

(65) Prior Publication Data
US 2021/0171049 A1    Jun. 10, 2021

(30) Foreign Application Priority Data
Dec. 5, 2019  (KR) .......................... 10-2019-0160942

(51) Int. Cl.
| | |
|---|---|
| *B60W 40/12* | (2012.01) |
| *B60W 40/105* | (2012.01) |
| *B60W 40/114* | (2012.01) |
| *G06V 20/58* | (2022.01) |

(52) U.S. Cl.
CPC .......... *B60W 40/12* (2013.01); *B60W 40/105* (2013.01); *B60W 40/114* (2013.01); *G06V 20/584* (2022.01); *B60W 2420/42* (2013.01); *B60W 2420/52* (2013.01); *B60W 2554/404* (2020.02)

(58) Field of Classification Search
CPC .. B60W 40/12; B60W 40/105; B60W 40/114; B60W 2420/42; B60W 2420/52; B60W 2554/404

See application file for complete search history.

(56) References Cited

FOREIGN PATENT DOCUMENTS

| | | | |
|---|---|---|---|
| JP | 2018-165074 | 10/2018 | |
| KR | 10-0868408 | 11/2008 | |
| KR | 100868408 B1 * | 11/2008 | ............ B20W 10/20 |

OTHER PUBLICATIONS

Bernoulli's Equation—flowpedia.com. Obtained from search on Bing. Bing results claim image was uploaded 4 years ago. (Year: 2018).*
Machine translation of KR10086840B1 downloaded from Espacenet (Year: 2022).*

* cited by examiner

*Primary Examiner* — Peter D Nolan
*Assistant Examiner* — Tanya C Sienko
(74) *Attorney, Agent, or Firm* — H.C. Park & Associates, PLC

(57) ABSTRACT

A device for recognizing a width of a vehicle, including include a weight selecting device that selects at least one weight among a plurality of weights based on a degree of shaking of a present vehicle in a left and right direction and outputs the selected weight as selected weight information when a following vehicle overtakes the present vehicle, a vehicle width calculation device that calculates a vehicle width of the vehicle that has overtaken the present vehicle based on front region image information containing the vehicle that has overtaken the present vehicle, and outputs the calculation result as image vehicle width calculation information, and a weight applying device that applies the selected weight information to the image vehicle width calculation information and outputs the selected weight information-applied image vehicle width calculation information as vehicle width information.

13 Claims, 4 Drawing Sheets ated on Dec. 5, 2019, which is hereby incorporated by reference for all purposes as if set forth herein.

DEVICE AND METHOD FOR RECOGNIZING WIDTH OF VEHICLE

CROSS-REFERENCE TO RELATED APPLICATION

This application claims priority from and the benefit of Korean Patent Application No. 10-2019-0160942, filed on Dec. 5, 2019, which is hereby incorporated by reference for all purposes as if set forth herein.

BACKGROUND

Field

Exemplary embodiments relate to a device and a method for recognizing a width of a vehicle.

Discussion of the Background

With development of an automobile industry, an autonomous driving system and a driving assistance system that partially enables autonomous driving (hereinafter, both the autonomous driving and driving assistance are referred to as the autonomous driving) are being developed.

An autonomous driving system may sense an external object of a vehicle and determine the sensed object to allow the vehicle to travel safely.

In particular, it is important to accurately recognize a width of a preceding vehicle to allow a present vehicle to travel safely from a potential threat of the preceding vehicle that has overtaken the present vehicle during travel.

The above information disclosed in this Background section is only for enhancement of understanding of the background of the invention and, therefore, it may contain information that does not constitute prior art.

SUMMARY

The present invention has been made to solve the above-mentioned problems occurring in the prior art while advantages achieved by the prior art are maintained intact.

Exemplary embodiments of the present invention provide a device and a method for recognizing a width of a vehicle that may more accurately recognize a vehicle width of a preceding vehicle.

Additional features of the invention will be set forth in the description which follows, and in part will be apparent from the description, or may be learned by practice of the invention.

An exemplary embodiment of the present invention provides a device for recognizing a width of a vehicle including a weight selecting device that selects at least one weight among a plurality of weights based on a degree of shaking of a present vehicle in a left and right direction and outputs the selected weight as selected weight information when a following vehicle overtakes the present vehicle, a vehicle width calculation device that calculates a vehicle width of the vehicle that has overtaken the present vehicle based on front region image information containing the vehicle that has overtaken the present vehicle, and outputs the calculation result as image vehicle width calculation information, and a weight applying device that applies the selected weight information to the image vehicle width calculation information and outputs the selected weight information-applied image vehicle width calculation information as vehicle width information.

Another exemplary embodiment of the present invention provides a device for recognizing a width of a vehicle including a front camera for providing front region image information, a yaw rate sensor for providing yaw rate information, a rear radar for providing rear radar information, a speed sensor for providing speed information of the present vehicle, and a vehicle width calculation device that generates vehicle width information based on the front region image information, the yaw rate information, the rear radar information, and the speed information.

Another exemplary embodiment of the present invention provides a method for recognizing a width of a vehicle including recognizing a following vehicle present within a preset distance from a present vehicle, calculating a relative speed of the recognized following vehicle to determine whether the following vehicle is overtaking the present vehicle, measuring a degree of shaking of the present vehicle when the following vehicle is overtaking the present vehicle, obtaining an image of the vehicle that has overtaken the present vehicle to calculate a vehicle width of the vehicle that has overtaken the present vehicle, and generating vehicle width information by applying a weight based on the measured shaking degree to the calculated vehicle width.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
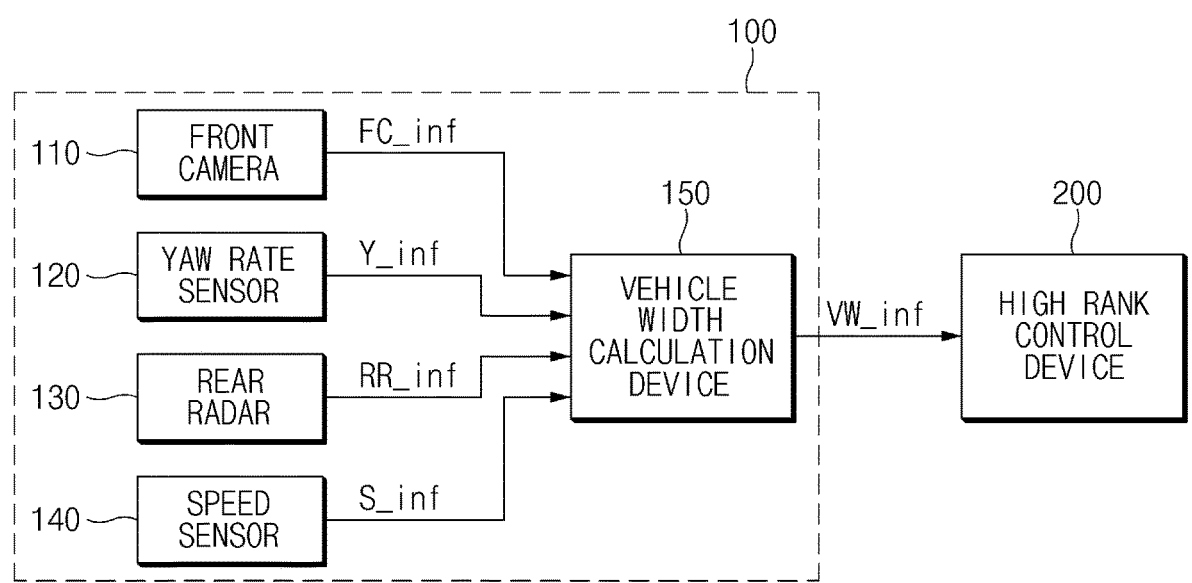
FIG. 1 is a block diagram illustrating a device for recognizing a width of a vehicle according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

In describing the components of the embodiment according to the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 4.

FIG. 1 is a block diagram illustrating a device for recognizing a width of a vehicle according to an embodiment of the present invention.

Referring to FIG. 1, a vehicle width recognition device 100 according to an embodiment of the present invention may be implemented inside a vehicle. In this connection, the vehicle width recognition device 100 may be integrally formed with internal control units of the vehicle, or may be implemented as a separate device and connected to the control units of the vehicle by separate connecting means.

The vehicle width recognition device 100 may include a front camera 110, a yaw rate sensor 120, a rear radar 130, a speed sensor 140, and a vehicle width calculation device 150. In this connection, the front camera 110, the yaw rate sensor 120, the rear radar 130, and the speed sensor 140 may be components that were previously mounted on the vehicle, or may be components newly mounted for the vehicle width recognition device 100 according to the present invention.

The front camera 110 may include a sensor or a device for obtaining a front region image of the vehicle.

For example, the front camera 110 may obtain the front region image of the vehicle and output the obtained image as front region image information FC_inf.

The yaw rate sensor 120 may detect a rotational angle speed in a vertical axis direction of the vehicle and output the detected rotational angle speed as yaw rate information Y_inf. That is, the yaw rate sensor 120 may output a movement (a shake) in a left and right direction of the vehicle as the yaw rate information Y_inf.

The rear radar 130 may sense an object located at a rear of the vehicle, and output a distance between the sensed object and the vehicle as rear radar information RR_inf. That is, the rear radar 130 may sense a following vehicle when traveling, measure a distance between the present vehicle and the following vehicle, and output the existence of a sensed object and the measured distance as the rear radar information RR_inf.

The speed sensor 140, which is a sensor for measuring a speed of the present vehicle, may output the speed of the present vehicle as speed information S_inf.

The vehicle width calculation device 150 may calculate a vehicle width of the preceding vehicle that has overtaken the present vehicle based on the front region image information FC_inf, the yaw rate information Y_inf, the rear radar information RR_inf, and the speed information S_inf, and output the calculated result as vehicle width information VW_inf.

For example, the vehicle width calculation device 150 may detect a following vehicle capable of overtaking the present vehicle based on the rear radar information RR_inf and the speed information S_inf, and may select a weight based on the shaking of the present vehicle, that is, the yaw rate information Y_inf when the detected following vehicle passes by the present vehicle and then overtakes the present vehicle.

The vehicle width calculation device 150 may calculate the vehicle width based on the front region image information FC_inf about the following vehicle that has overtaken the present vehicle, that is, a current preceding vehicle, apply the selected weight to the calculated result, and output the calculated result to which the selected weight is applied as the vehicle width information VW_inf.

A high rank control device 200 may determine whether there is a possibility of a collision with the preceding vehicle that has overtaken the present vehicle or select a travel route during avoidance travel for the preceding vehicle based on the vehicle width information VW_inf.

Figure 2:
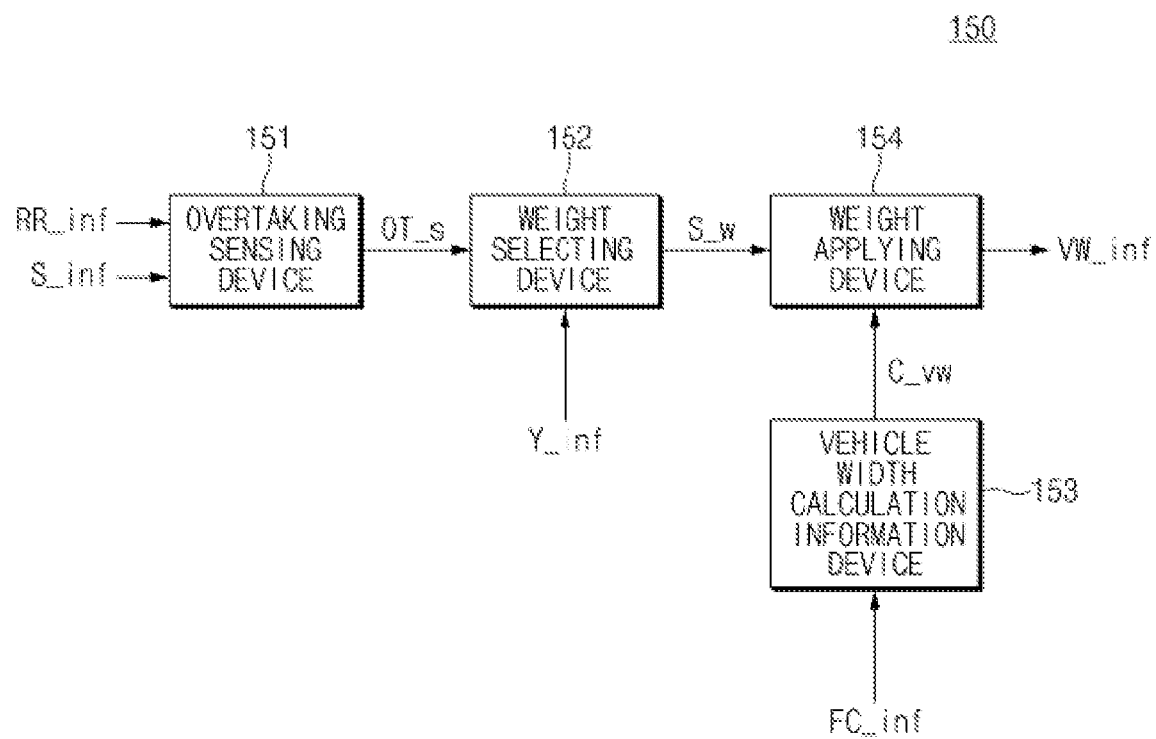
FIG. 2 is a block diagram illustrating a vehicle width calculation device according to an embodiment of the present invention.

FIG. 2 is a block diagram illustrating a vehicle width calculation device 150 according to an embodiment of the present invention.

A configuration and an operation of the vehicle width calculation device 150 will be described with reference to FIG. 2 as follows.

Referring to FIG. 2, the vehicle width calculation device 150 may include an overtaking sensing device 151, a weight selecting device 152, a vehicle width calculation information device 153, and a weight applying device 154.

The overtaking sensing device 151 may generate an overtaking signal OT_s by detecting the following vehicle capable of overtaking the present vehicle based on the rear radar information RR_inf and the speed information S_inf.

For example, the overtaking sensing device 151 may sense a following vehicle within a preset distance based on the rear radar information RR_inf, and calculate a speed of the sensed following vehicle.

The overtaking sensing device 151 may calculate a relative speed by comparing the speed information S_inf, that is, the speed of the present vehicle with the calculated speed of the following vehicle, and enable the overtaking signal OT_s when it is determined that the following vehicle is capable of overtaking the present vehicle based on the calculated relative speed.

In one example, the overtaking sensing device 151 may not enable the overtaking signal OT_s when it is determined that the following vehicle cannot overtake the present vehicle.

The weight selecting device 152 may select one weight among a plurality of preset weights based on the overtaking signal OT_s and the yaw rate information Y_inf, and output the selected weight as selected weight information S_w.

When the overtaking signal OT_s is enabled, the weight selecting device 152 may select one weight among the plurality of preset weights based on the yaw rate information Y_inf, and output the selected weight as the selected weight information S_w.

For example, when the overtaking signal OT_s is enabled, the weight selecting device 152 may select a weight corresponding to a yaw rate value based on the yaw rate information Y_inf, and output the selected weight as the selected weight information S_w.

In a more detailed example, when the overtaking signal OT_s is enabled, the greater the yaw rate value based on the yaw rate information Y_inf is, the weight selecting device 152 may select a weight with a greater yaw rate value, and output the selected weight as the selected weight information S_w.

The vehicle width calculation information device 153 may calculate the vehicle width of the preceding vehicle that has overtaken the present vehicle based on the front region image information FC_inf.

For example, the vehicle width calculation information device 153 may sense the preceding vehicle that has overtaken the present vehicle from the front region image information FC_inf, calculate the vehicle width of the sensed preceding vehicle through an image of the preceding vehicle contained in the front region image information FC_inf, and output the calculated vehicle width of the sensed preceding vehicle as image vehicle width calculation information C_vw.

The weight applying device 154 may generate the vehicle width information VW_inf based on the image vehicle width calculation information C_vw and the selected weight information S_w.

For example, the weight applying device 154 may generate the vehicle width information VW_inf by applying the selected weight information S_w to the image vehicle width calculation information C_vw.

In a more detailed example, assuming that the image vehicle width calculation information C_vw is 1.9 and the selected weight information S_w is 1.2, the weight applying device 154 may generate the vehicle width information VW_inf of 2.28=1.9*1.2.

Operations of the vehicle width recognition device according to an embodiment of the present invention configured as described above will be described with reference to FIGS. 1, 2, and 4 as follows. In this connection, FIG. 4 indicates the present vehicle as A and indicates the following vehicle overtaking the present vehicle as B.

When the following vehicle B is sensed in an overtaking vehicle sensing range of the rear radar 130, the overtaking sensing device 151 of the vehicle width calculation device 150 may calculate a speed of the sensed following vehicle B based on the rear radar information RR_inf. In this connection, the fact that the following vehicle B is sensed in the overtaking vehicle sensing range of the rear radar 130 may mean that the following vehicle B is sensed within the preset distance from the present vehicle.

The overtaking sensing device 151 may receive the speed information S_inf of the present vehicle from the speed sensor 140, and compare the speed information S_inf of the present vehicle with the calculated speed of the rear vehicle to calculate the relative speed.

The overtaking sensing device 151 may enable the overtaking signal OT_s when it is determined that the following vehicle is capable of overtaking the present vehicle based on the calculated relative speed.

Figure 4:
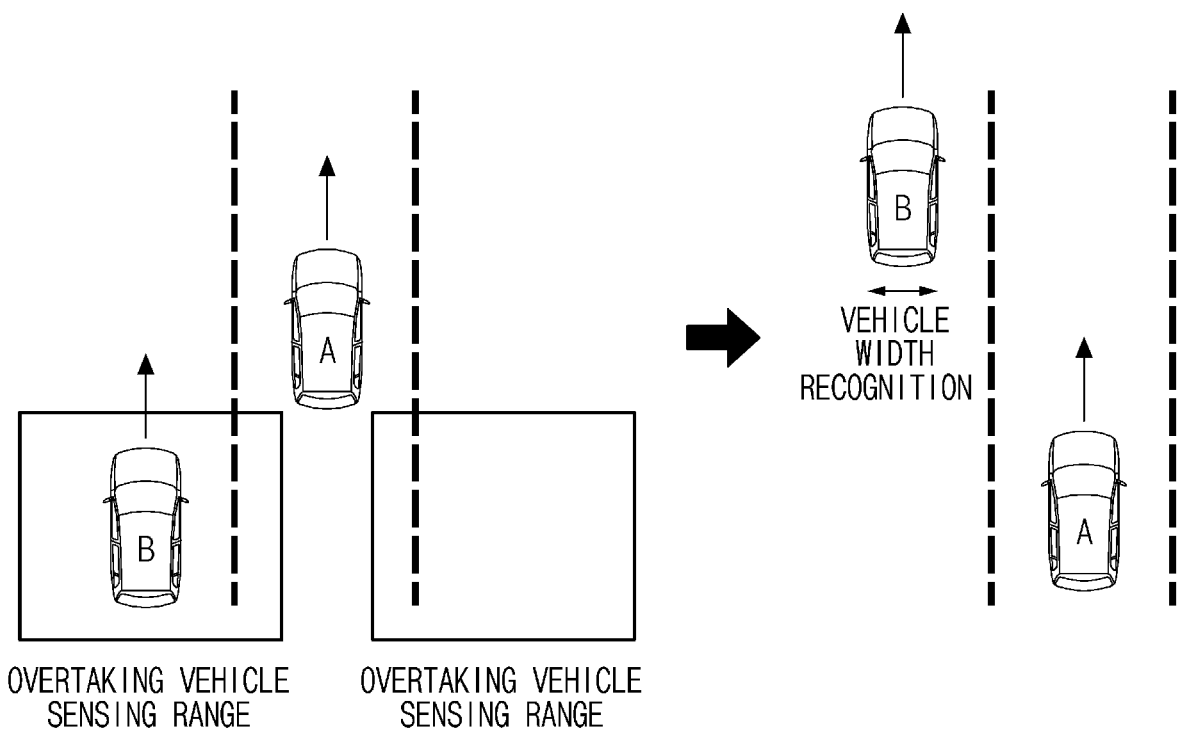
FIG. 4 is a view for illustrating a device and a method for recognizing a width of a vehicle according to an embodiment of the invention.

As shown in a left diagram in FIG. 4, it is assumed that the following vehicle B sensed in the overtaking vehicle sensing range of the rear radar 130 overtakes the present vehicle A, as shown in a right diagram in FIG. 4. In this connection, when the following vehicle B overtakes the present vehicle A, the present vehicle A may shake in the left and right direction affected by a lateral wind caused by the following vehicle B overtaking the present vehicle A. In particular, the larger the size of the following vehicle B overtaking the present vehicle, the greater the degree of the shaking of a body of the present vehicle A in the left and right direction.

Therefore, the vehicle width recognition device 100 according to the present invention applies the weight to the vehicle width of the preceding vehicle based on the degree of the shaking of the vehicle in the left and right direction when the following vehicle overtakes the present vehicle and becomes the preceding vehicle, that is, the yaw rate information Y_inf using the yaw rate sensor 120 capable of sensing the shaking of the vehicle in the left and right direction, thereby recognizing the vehicle width with greater accuracy.

When the overtaking signal OT_s is enabled, the weight selecting device 152 may select one weight among the plurality of weights having preset values based on the yaw rate information Y_inf.

For example, when the overtaking signal OT_s is enabled, the greater the yaw rate value based on the yaw rate information Y_inf is, the weight selecting device 152 may select the weight with the greater yaw rate value, and output the selected weight as the selected weight information S_w.

When the following vehicle B overtakes the present vehicle A and becomes the preceding vehicle, the vehicle that has overtaken the present vehicle may be contained in the front region image information FC_inf obtained by the front camera 110.

The vehicle width calculation information device 153 may calculate the vehicle width of the vehicle that has overtaken the present vehicle based on the image information of the vehicle that has overtaken the present vehicle, that is, the front region image information FC_inf, and output the calculated result as the image vehicle width calculation information C_vw.

The weight applying device 154 may apply the selected weight information S_w to the image vehicle width calculation information C_vw and output the result as the vehicle width information VW_inf.

In general, because the vehicle width is recognized only by the image of the front camera, it is difficult to accurately estimate the width of the vehicle only with the image due to characteristics of the camera, which is greatly affected by external influences such as weather.

However, when the following vehicle overtakes the present vehicle, the vehicle width recognition device according to the inventive concepts may select the weight for the vehicle width of the vehicle that has overtaken the present vehicle based on the influence of the lateral wind on the present vehicle by the vehicle that has overtaken the present vehicle, that is, the degree of the shaking in the left and right direction, and apply the selected weight to the front region image information containing the vehicle that has overtaken the present vehicle, thereby improving an accuracy of the vehicle width.

Figure 3:
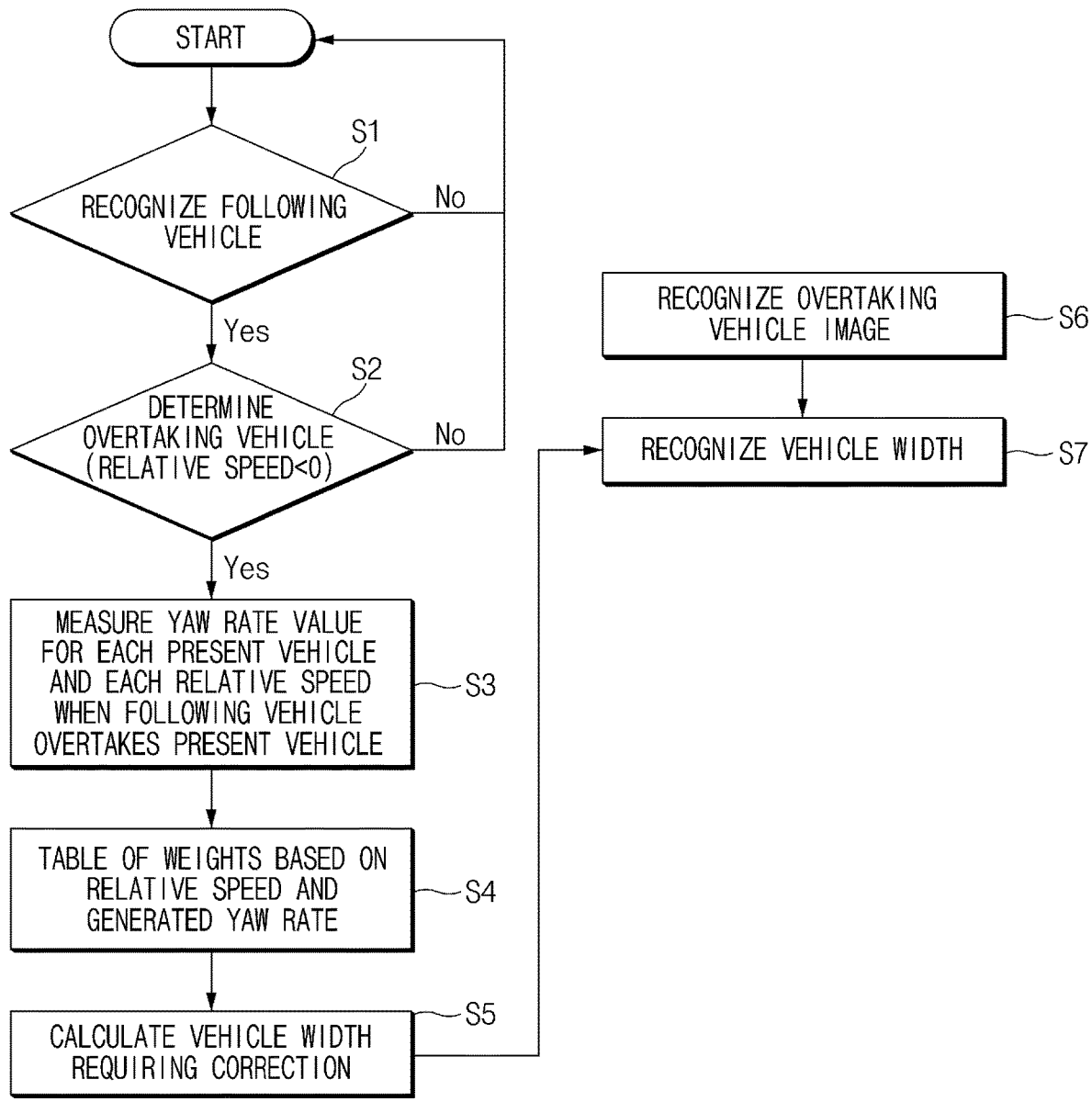
FIG. 3 is a flowchart for illustrating a method for recognizing a width of a vehicle according to an embodiment of the present invention.

A summarization of a vehicle width recognition method of the vehicle width recognition device according to the present invention with reference to FIG. 3 is as follows.

A following vehicle recognition operation (S1) may include determining whether the following vehicle is sensed (recognized) in the overtaking vehicle sensing range of the rear radar 130 installed on the present vehicle.

When the following vehicle is recognized (Yes) in the following vehicle recognition operation (S1), an overtaking vehicle determination operation (S2) of determining whether the following vehicle is overtaking may be performed. In this connection, the overtaking vehicle determination operation (S2) may include calculating the speed of the following vehicle from the rear radar 130 and calculating the relative speed by comparing the calculated speed of the following vehicle with the speed information S_inf provided from the speed sensor of the present vehicle. When the relative speed is less than 0, it may be determined that the following vehicle is capable of overtaking the present vehicle.

When it is determined that the following vehicle is capable of overtaking the present vehicle (Yes) and then the following vehicle overtakes the present vehicle, an operation of measuring a yaw rate value for each relative speed (S3, measuring a yaw rate value for each present vehicle and each relative speed when the following vehicle overtakes the present vehicle) may be performed. That is, when the following vehicle passes by the present vehicle and overtakes the present vehicle, the shaking of the present vehicle in the left and right direction may be measured.

When the following vehicle is determined to be the overtaking vehicle, an operation of activating the plurality of weights having the preset values, that is, a weight table (S4, a table of weights based on the relative speed and the generated yaw rate) may be performed.

In response to the measured yaw rate value, an operation of selecting at least one weight among the plurality of weights stored in the activated weight table (S5, calculating the vehicle width requiring the correction) may be performed.

An operation of recognizing the vehicle that has overtaken the present vehicle from the front region image information by the front camera (S6, recognizing the overtaking vehicle image) may be performed. In this connection, the overtaking vehicle image recognition operation (S6) may include calculating the vehicle width of the overtaking vehicle contained in the front region image information.

An operation of recognizing the vehicle width (S7, recognizing the vehicle width) may be performed by applying the selected weight information (the weight selected in S5) to the image vehicle width calculation information calculated based on the front region image information.

This technology may be used as very important information when determining the possibility of the collision with the preceding vehicle by increasing the accuracy of the recognition of the vehicle width of the preceding vehicle, and may improve stability of autonomous driving.

Hereinabove, although the inventive concepts have been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A device installed in a first vehicle for recognizing a width of a second vehicle, the device comprising:

a weight selecting device configured to select at least one weight among a plurality of weights based on a degree of shaking of the first vehicle in a left and right direction and output the selected weight as selected weight information when the second vehicle, which initially follows the first vehicle, overtakes the first vehicle;

a vehicle width calculation device configured to calculate a vehicle width of the second vehicle that has overtaken the first vehicle based on front region image information containing the second vehicle that has overtaken the first vehicle, and output the calculation result as image vehicle width calculation information for the second vehicle;

a weight applying device configured to apply the selected weight information to the image vehicle width calculation information and output the result as vehicle width information for the second vehicle;

an overtaking sensing device configured to determine whether the second vehicle is overtaking the first vehicle;

a front camera configured to obtain the front region image information;

a yaw rate sensor configured to obtain the degree of the shaking of the first vehicle in the left and right directions;

a rear radar configured to sense the second vehicle; and a speed sensor configured to sense a speed of the first vehicle.

2. The device of claim 1, wherein the overtaking sensing device is configured to:

sense the second vehicle within a preset distance based on rear radar information provided from the rear radar;

calculate a speed of the sensed second vehicle; and compare calculated speed information of the second vehicle with speed information of the speed sensor to calculate a relative speed to determine whether the second vehicle is overtaking the first vehicle.

3. The device of claim 2, wherein the overtaking sensing device is configured to determine that the second vehicle is capable of overtaking the first vehicle when the relative speed is less than 0.

4. The device of claim 1, wherein the weight selecting device is configured to:

select the at least one weight among the plurality of weights based on yaw rate information output from the yaw rate sensor when the second vehicle passes by and overtakes the first vehicle; and output the selected weight as the selected weight information.

5. The device of claim 4, wherein the weight selecting device is configured to select a weight having a greater value among the plurality of weights as a yaw rate value of the yaw rate information increases.

6. A device installed in a first vehicle for recognizing a width of a second vehicle, the device comprising:

a front camera configured to provide front region image information;

a yaw rate sensor configured to provide yaw rate information for the first vehicle;

a rear radar configured to provide rear radar information;

a speed sensor configured to provide speed information for the first vehicle; and a vehicle width calculation device configured to generate vehicle width information for the second vehicle based on the front region image information, the yaw rate information, the rear radar information, and the speed information.

7. The device of claim 6, wherein the vehicle width calculation device includes:
an overtaking sensing device configured to generate an overtaking signal based on the rear radar information and the speed information for the first vehicle;
a weight selecting device configured to generate selected weight information based on the overtaking signal and the yaw rate information for the first vehicle;
a vehicle width calculation information device configured to generate image vehicle width calculation information for the second vehicle based on the front region image information; and
a weight applying device configured to generate the vehicle width information for the second vehicle based on the selected weight information and the image vehicle width calculation information for the second vehicle.

8. The device of claim 7, wherein the overtaking sensing device is configured to:
calculate a speed of the second vehicle based on the rear radar information when the second vehicle within a preset distance is sensed;
calculate a relative speed based on the calculated speed of the second vehicle and the speed information for the first vehicle; and
determine whether to enable the overtaking signal based on the relative speed.

9. The device of claim 7, wherein the weight selecting device is configured to:
select a weight corresponding to a yaw rate value based on the yaw rate information among a plurality of weights having preset values when the overtaking signal is enabled; and
output the selected weight as the selected weight information.

10. The device of claim 7, wherein the vehicle width calculation information device is configured to:
calculate a vehicle width of the second vehicle that has overtaken the first vehicle based on the front region image information containing the second vehicle that has overtaken the first vehicle; and
output a calculation result as the image vehicle width calculation information for the second vehicle.

11. The device of claim 7, wherein the weight applying device is configured to generate the vehicle width information for the second vehicle by applying a weight value contained in the selected weight information to a calculated vehicle width value of the second vehicle that has overtaken the first vehicle based on the image vehicle width calculation information for the second vehicle.

12. A method for recognizing a width of a second vehicle, the method comprising:
recognizing that the second vehicle, which initially follows a first vehicle, is present within a preset distance from the first vehicle;
calculating a relative speed of the recognized second vehicle to determine whether the second vehicle is overtaking the first vehicle;
measuring, using a yaw rate sensor, a degree of shaking of the first vehicle when the second vehicle is overtaking the first vehicle;
obtaining an image of the second vehicle that has overtaken the first vehicle to calculate a vehicle width of the second vehicle that has overtaken the first vehicle; and
generating vehicle width information for the second vehicle by applying a weight based on the measured shaking degree to the calculated vehicle width of the second vehicle.

13. The method of claim 12, wherein the measuring of the degree of the shaking of the first vehicle when the second vehicle is overtaking the first vehicle includes measuring a yaw rate value for the first vehicle with the yaw rate sensor when the second vehicle is overtaking the first vehicle.

* * * * *